United States Patent
Collignon et al.

(10) Patent No.: US 10,642,470 B2
(45) Date of Patent: May 5, 2020

(54) METHOD FOR SELECTING A PLURALITY OF ENTRIES ON A USER INTERFACE

(71) Applicant: Orange, Paris (FR)

(72) Inventors: Vivien Collignon, Vezin-Le-Coquet (FR); Rudy De Belgeonne, London (GB)

(73) Assignee: ORANGE, Paris (FR)

(*) Notice: Subject to any disclaimer, the term of this patent is extended or adjusted under 35 U.S.C. 154(b) by 221 days.

(21) Appl. No.: 14/105,755

(22) Filed: Dec. 13, 2013

(65) Prior Publication Data

US 2014/0195966 A1 Jul. 10, 2014

(30) Foreign Application Priority Data

Dec. 14, 2012 (EP) .................................... 12306588

(51) Int. Cl.
*G06F 3/0485* (2013.01)
*G06F 3/0482* (2013.01)
*G06F 3/0488* (2013.01)

(52) U.S. Cl.
CPC .......... *G06F 3/0485* (2013.01); *G06F 3/0482* (2013.01); *G06F 3/0488* (2013.01); *G06F 3/04883* (2013.01)

(58) Field of Classification Search
CPC .. G06F 3/0482; G06F 3/04883; G06F 3/0485; G06F 3/0488
USPC ....................................................... 715/786
See application file for complete search history.

(56) References Cited

U.S. PATENT DOCUMENTS

| | | | | |
|---|---|---|---|---|
| 6,147,683 A | * | 11/2000 | Martinez | G06F 3/04855 715/786 |
| 6,509,908 B1 | * | 1/2003 | Croy | H04N 5/4403 348/552 |
| 7,761,812 B2 | * | 7/2010 | Ostojic | H04N 5/44513 715/835 |
| 8,638,939 B1 | * | 1/2014 | Casey | G06F 21/36 380/277 |
| 8,881,251 B1 | * | 11/2014 | Hilger | H04L 63/083 713/183 |

(Continued)

OTHER PUBLICATIONS

European Search Report dated May 8, 2013 for corresponding European Patent Application No. 12306588.0, filed Dec. 14, 2012.

(Continued)

*Primary Examiner* — Li P Sun
*Assistant Examiner* — Henry Orr
(74) *Attorney, Agent, or Firm* — David D. Brush; Westman, Champlin & Koehler, P.A.

(57) ABSTRACT

A method is provided for validating a selection of entries from a user through a user interface displayed on an electronic device. The method includes the steps of displaying on the user interface the plurality of entries through a first and at least a second list both movable separately along a first direction of the user interface, capturing a user input on the first list to move the first list from a first to a second position in the first direction, detecting a user sliding input from a first entry of the first list in the second position in a second direction distinct from the first direction and towards the at least second list, and selecting the first entry and a second entry of the at least second list in the direction of the user sliding input.

18 Claims, 7 Drawing Sheets

(56) References Cited

U.S. PATENT DOCUMENTS

| | | | | |
|---|---|---|---|---|
| 2003/0112467 A1* | 6/2003 | McCollum | G06F 3/0482 | 358/1.18 |
| 2004/0100504 A1* | 5/2004 | Sommer | G06F 3/0482 | 715/810 |
| 2005/0044425 A1* | 2/2005 | Hypponen | G06F 21/36 | 726/19 |
| 2007/0150842 A1* | 6/2007 | Chaudhri | G06F 3/04883 | 715/863 |
| 2007/0277124 A1* | 11/2007 | Shin | G06F 3/04883 | 715/863 |
| 2008/0165141 A1* | 7/2008 | Christie | G06F 3/044 | 345/173 |
| 2008/0184360 A1* | 7/2008 | Kornilovsky | G06F 3/0362 | 726/17 |
| 2009/0128505 A1* | 5/2009 | Partridge | G06F 3/04883 | 345/173 |
| 2010/0299599 A1* | 11/2010 | Shin | G06F 3/0482 | 715/702 |
| 2012/0030566 A1* | 2/2012 | Victor | G06F 3/0482 | 715/702 |
| 2012/0096400 A1* | 4/2012 | Cho | G06F 3/0482 | 715/810 |
| 2013/0326611 A1* | 12/2013 | Gargi | G06F 21/31 | 726/16 |
| 2015/0012885 A1* | 1/2015 | Bergdahl | G06F 3/0482 | 715/821 |
| 2015/0074606 A1* | 3/2015 | Melen | G06F 3/04817 | 715/835 |

OTHER PUBLICATIONS

Kankan: "Wheel UI Control", Android dev blog, May 25, 2010 (May 25, 2010), XP055061312, Retrieved from the Internet: URL: http://android-devblog.blogspot.nl/2010/05/wheel-ui-control.html.

"Neonode N2 user guide", Oct. 25, 2007 (Oct. 25, 2007), pp. 1-45, XP055061313, www.neonode.com, Retrieved from the Internet: URL: http://www.unlocked-mobiles.com/images/manuals/Neonode_N2_User_manual.pdf [retrieved on Apr. 19, 2013].

* cited by examiner

METHOD FOR SELECTING A PLURALITY OF ENTRIES ON A USER INTERFACE

FIELD OF THE PRESENT SYSTEM

The present invention relates in general to user interfaces on an electronic device. More particularly, the present invention relates to a method for selecting a plurality of entries through such user interfaces.

BACKGROUND OF THE INVENTION

Today electronic devices like smartphones offer various user interactions through graphical user interfaces (GUIs). Such interactions may be for instance entered through touch inputs from the user or a stylus. The interactions may be used to implement various functions of an application running on the electronic device. Such functions may be for instance selections of entries presented to the user through a GUI.

Among possible entries proposed to the user, scrollable list, presented to the user through a list of entries movable in a first direction of the user interface, offer an interesting user experience for an easy selection.

An example of a known scrollable list, as known from document US2010/0299599, in a scrolling direction 110, is illustrated in FIG. 1. Such a document teaches a method for selecting a first entry from a plurality of entries and comprising:

1. displaying the plurality of entries through a scrollable list;
2. capturing a user input on the scrollable list to move the list from a first to a second position, in a first direction;
3. detecting a user sliding input on a first entry of the list, in a direction distinct from the direction;
4. selecting the first entry.

Thanks to the present teachings, a user input on an entry of the list, one scrolled, can allow the selection of an entry. Such a user input may be for instance a sliding input across the first entry 120. Such a selection method is for instance used in the operating system Android™ as available on Samsung™ smartphones. Indeed the user can access the call log list, presented in GUI with a scrollable list. Once the list is moved in a direction to show a number of interests to the user, the user can actually select the number 120 and place a call through a sliding motion in the direction transverse to the scrolling direction 110.

The selection method is nonetheless limited to one entry in a first list. It would be interesting to improve a selection method offered to a user when multiple scrollable lists are presented to the user.

Today the only possibility offered to a user is a selection button as illustrated in FIG. 1B. Indeed, first and second scrollable lists, 130 and 135 respectively, are shown with a selection button 150. Once the user has moves both lists in the same direction 110 to display desired values 160 in a highlighted zone 170, here for instance in the middle of the scrollable lists, the user will have to hit the selection button 150 to validate his entries.

This remains a tedious selection method as the user needs to move reach selection button. Furthermore, the need of an extra selection button 150 limits the possibilities of developers to present reach and flexible GUIs.

Today there is still a need for an improved selection method in the presence of multiple scrollable lists. There is a further need for a method that gives the developers more room and hence flexibility when managing the GUIs of an application.

SUMMARY OF THE PRESENT SYSTEM

The present system relates to method for selecting entries from a user through a user interface displayed by an electronic device, the method comprising the steps of: displaying on the user interface the plurality of entries through a first and at least a second list both movable separately along a first direction of the user interface; capturing a user input on the first list to move said first list from a first to a second position in the first direction; detecting a user sliding input from a first entry of the first list in the second position in a second direction distinct from the first direction and towards the at least second list; selecting the first entry and a second entry of the at least second list in the direction of the user sliding input Such a method advantageously allows a user to make an easy selection of several entries among a plurality of scrollable lists. Indeed, the user can scroll a list in the first direction to select the desired entry among the list, and then may easily select all elected entries in one simple gesture by just sliding over the entries in a second direction. With such a method, only simple gestures like sliding are used. Moreover, the method advantageously allows the different lists to be displayed using all the available space on the display. Indeed, no additional button is necessary, thus improving the readability of the lists on user interface.

Another advantage of present method is that when the user first selects the entries by beginning the user gesture sliding, the user gets insurance that by finishing the gesture, thus triggering the validation, he will validate the selected entries and no others entries. Moreover user sliding inputs are less sensitive than a touch on a button like shown in FIG. 1 150 to user errors, as it avoids errors by pressing inadvertently a button 150

In a complementary embodiment, the method further comprises the step of validating the first entry and the second entry of the at least second list.

Advantageously, the method allows the user to perform via a single user input, for example a sliding gesture, the selecting and the validation of said selection. Validation should be understood here as the execution of a predefined action of an application using the selected entries as inputs. This method allows a straightforward and intuitive validation of the selected entries in a single gesture for the user.

In a complementary embodiment of present method, the detecting of a user sliding further comprises the step of locking the movement of the first and at least second list along the first direction.

Such step improves the user selection ergonomic by freezing or locking the scrollable lists, preventing any accidental change of an entry previously chosen by the user if the user sliding is not exactly along the second direction. Also, it advantageously gives a visual feedback to the user that he moved from the step of choosing entries among the lists to the step of selecting said choice of entries.

In a further embodiment of present method, the selecting of the first entry and at least a second entry further comprises the step of displaying on the user interface a graphical indication highlighting the first and at least second entries in the second direction.

Again, this further embodiment is important to give a visual feedback to the user that he has moved from the step of choosing entries among the lists to the step of selecting said choice of entries. This step solves the problem of showing to the user what the selected entries are.

In another embodiment of present method, the selecting of the first entry and at least a second entry comprises the step of selecting the first entry and a second entry of the at least second list when the user sliding input along the second direction reaches a predefined distance.

This step allows the user to first begin to slide over the selected entries, visualizing the selected entries, having a possibility to reconsider its choices if need be. Only if the user continues its gesture reaching a predetermined distance on the screen then the selecting of the entries occurs. By proceeding like that, the user always has a control on the selection he is performing.

In a further complementary embodiment of the present method the first and second entries are associated respectfully to first and second graphical objects and the selecting of the first entry and a second entry further comprises the step of moving the first and second graphical objects along the second direction with the user sliding input.

This further complementary embodiment participates to give to the user a visual feedback on the selection of the entries. Again, it participates to obtain a self-explanatory and intuitive interface for the user. By moving the graphical objects along the user sliding gesture input, it gives an immediately understandable feedback for the user.

The present invention comprises an electronic device with a user interface, the electronic device comprising a processor arranged to display on the user interface a plurality of entries through a first and at least a second list both movable separately along a first direction of the user interface; capture a user input on the first list to move said first list from a first to a second position in the first direction; detect a user sliding input from a first entry of the first list in the second position in a second direction distinct from the first direction and towards the at least second list; select the first entry and a second entry of the at least second list in the direction of the user sliding input.

Finally, one object of the invention concerns a computer program, in particular computer programs on or in an information medium or memory, suitable for implementing the method for selecting entries from a user through a user interface displayed on an electronic device object of the invention. These programs can use any programming language, and be in the form of source code, binary code, or of code intermediate between source code and object code such as in a partially compiled form, or in any other desirable form for implementing the methods according to the invention.

The information medium may be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium may be a transmissible medium such as an electrical or optical signal, which may be conveyed via an electrical or optical cable, by radio or by other means. The program according to the invention may in particular be downloaded from a network of Internet type.

BRIEF DESCRIPTION OF THE DRAWINGS

One or more examples of the present invention are explained in further detail, and by way of example, with reference to the accompanying drawings wherein.

DETAILED DESCRIPTION

In the following description of the method, the words "select" and "choose" (or "selected" and "chosen") may be indifferently used as their meaning is quite similar. However, a special attention was made to use preferably "choose" when talking about the choice of an entry among a scrollable list and to use preferably "select" when talking about the selection of the different entries.

Moreover, the term selection should be understood here as the selection of the entries, eventually including the validation of said selection of entries. Indeed, as it will be described hereafter, the selection of the entries may lead to the execution of any application, advantageously using said selection as an input for the executed application.

The present text describes mainly a method using two scrollable lists, but it should be understood that the same method can be implemented using a higher number of scrollable lists, the method does not have inherent limit to the number of lists used.

It should also be noted that the value chosen among for example the first scrollable list may affect the list of values presented in another scrollable list, for example the second scrollable list. Indeed, for example, if the value "movie" is chosen in the first scrollable list, the second scrollable list may be updated as to offer the choice between several movies, whereas if the value "concert" was chosen in the first scrollable list, the second scrollable list would have been updated as to offer choice between different concerts.

It should be noted that the word direction is used hereafter without notion of orientation; meaning that no restriction is done on the way along a direction a user gesture is performed. As an illustration, a user sliding along a horizontal direction could be performed right-to-left or left-to-right, unless specified otherwise.

Present method relates to a method that can be implemented on a touch display. For this reason user inputs are considered to be mainly user gesture on the display, for example sliding gesture. Thus, in the following text "user input" or "user gesture" expressions will be indifferently used. However, this should not be considered as a limitation as the present method could also be implemented using other user input via other input device, like for example a computer mouse, a touch pen or any other input device commonly used with an electronic device.

Present method could be implemented on an electronic device such as a pair of glasses, for example a pair of glasses as developed in Google™ glass project. In this case, the display would be a virtual display or a display projected on any surface, here the surface of the pair of glasses. User input in this case, may be gesture that can be captured with a device similar to Microsoft™ kinect, possibly integrated in the pair of glasses, or detection of user's retina movement.

Figure 1A:
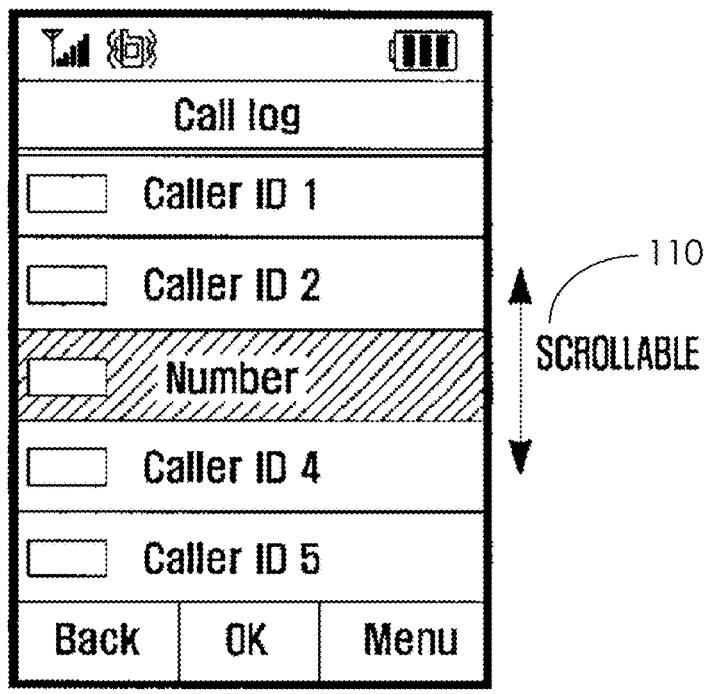
FIGS. 1A and 1B show exemplary embodiments of an electronic device display in accordance with known methods.
Figure 1B:
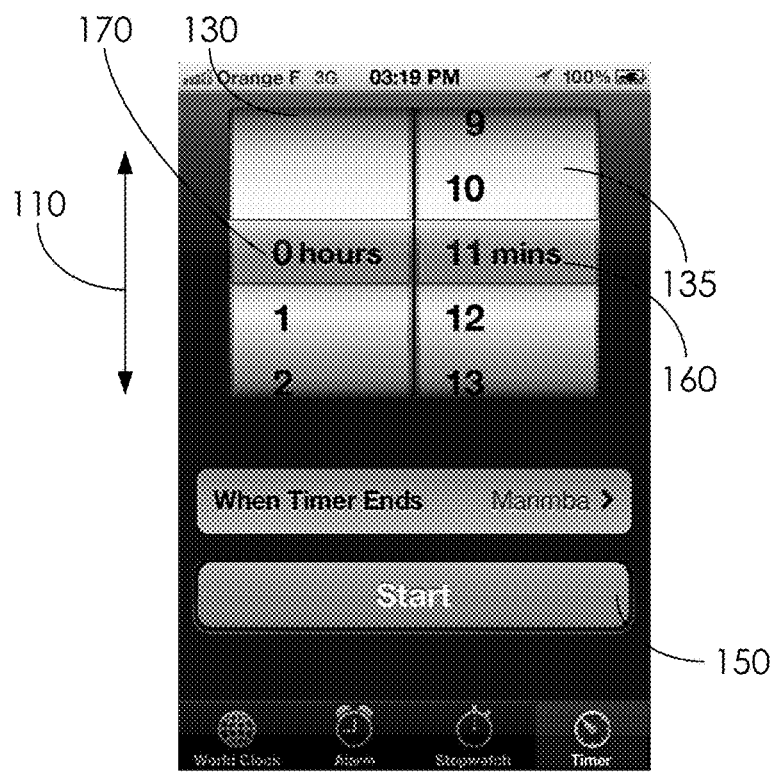

FIGS. 1A and 1B have been previously described.

Figure 2:
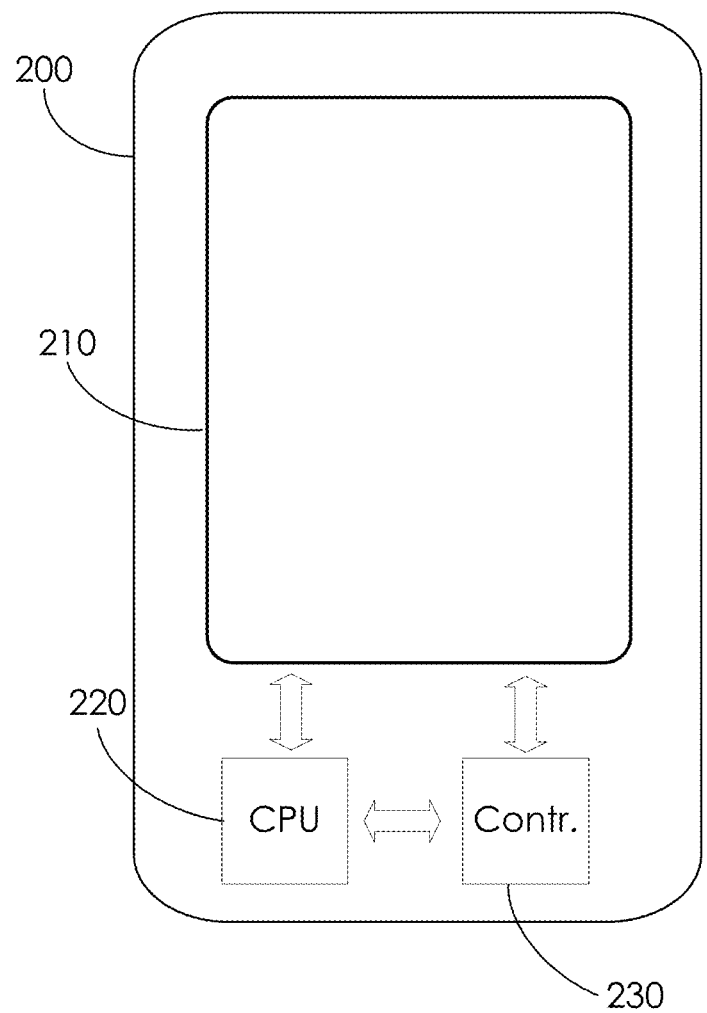
FIG. 2 shows an exemplary embodiment of an electronic device according to the present invention.

FIG. 2 is an illustration of an exemplary electronic device 200 used in the present system. The electronic device 200 comprises at least a display device 210, a processor 220 and a controller 230 of the display device 210 (in short display controller 230).

In the present system, the user interaction with and manipulation of application programs (APs) rendered on a GUI (graphical user interface) may be achieved using the display device 210 (in short display), or screen, which is illustrated here as a touch panel operationally coupled to the processor 220 controlling the displayed interface. An input device (not shown in FIG. 2) and display device 210 appear thus as one of the same to the user.

Processor 220 may control the rendering and/or the display of the GUI on the display device 210 depending on the type of application program (AP), i.e. resident or web-based. The control of the rendering on the display 210 by the processor 220 may be direct or conversely rely on a controller 230 of the display device 210. Processor 220 may also handle, either directly or through the display controller display 230, the user entries according to the present method, like the user input on the first list to scroll the list in a first direction, or the user sliding input on a first entry of the first in direction of the second list. The user entries to interact with an application program may be provided through interactions with the touch panel 210.

The touch panel 210 can be seen as an input device allowing interactions with a finger of a user or other devices such as a stylus. Touch sensor interface or touch panel 210 may include any suitable circuitry to convert analog signals corresponding to touch input received over its surface into any suitable digital touch input data. Such touch input data can, for example, be used to make selections of portions of the GUI of an AP. The input received from a user's touch is sent to the processor 220. The touch panel 210 is configured to detect and report the (location of the) touches to the processor 220, which can interpret the touches in accordance with the application program and the currently displayed GUI.

The touch panel 210 can be based on sensing technologies including but not limited to capacitive sensing, resistive sensing, surface acoustic wave sensing, pressure sensing, optical sensing, and/or the likes.

Figure 3:
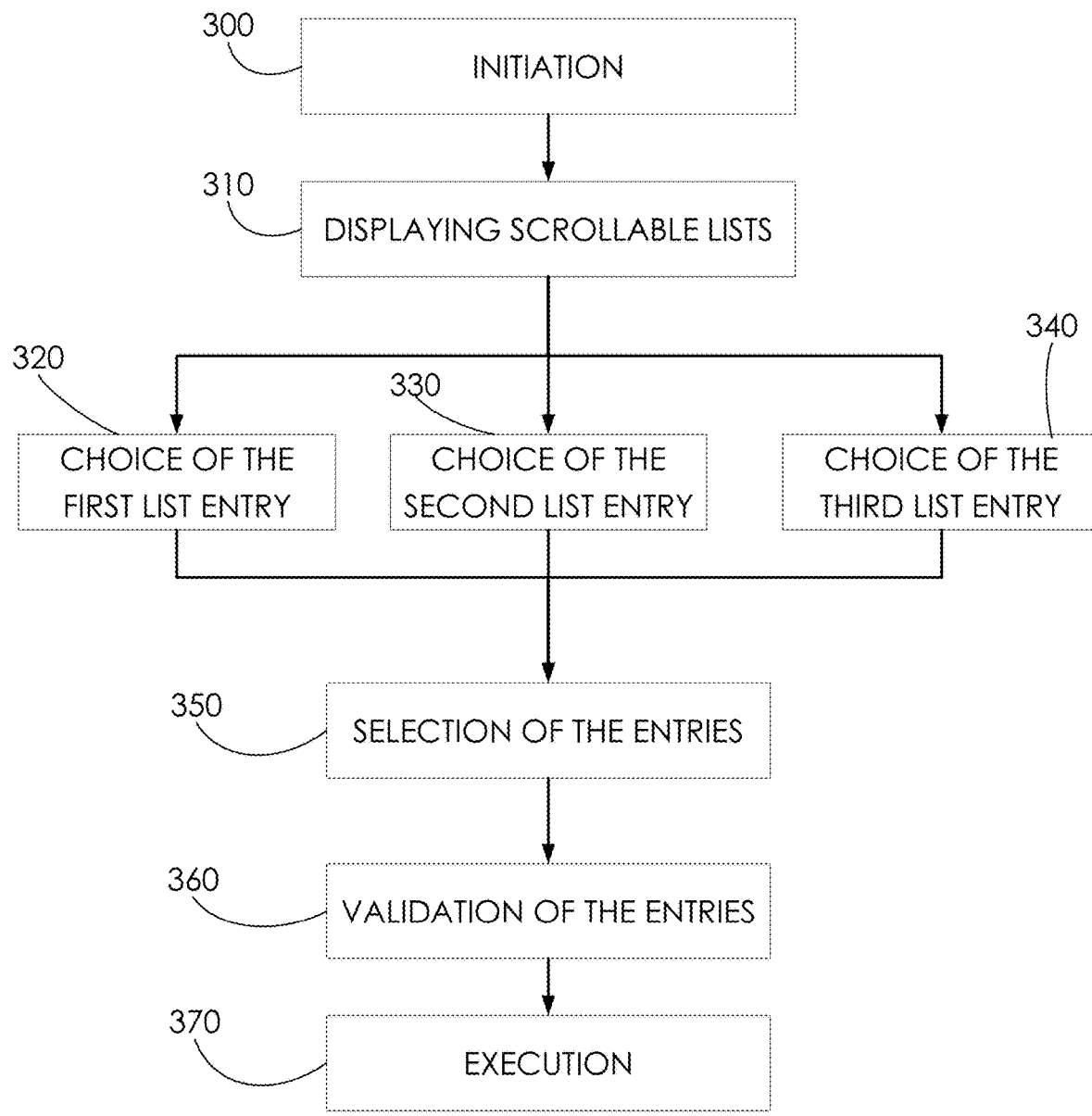
FIG. 3 shows an exemplary flowchart for the selection of entries according to an embodiment of the present invention; and, FIGS. 4A, 4B and 4C show exemplary GUIS for the selection of entries in accordance with additional embodiments of the present system.

FIG. 3 shows an exemplary flowchart for the selection of entries according to an embodiment of the present invention. In a first step 300, the user may execute on the electronic device 200 an application or may access a menu offering to select values or entries. This could be for example as shown in FIG. 1B a timer application or any system menu. In the next step 310, the electronic device, or the application executed on said electronic device, displays on the user interface or display the plurality of entries through a first and at least a second list both movable separately along a first direction of the user interface. In short, the application displays the different lists of entries according to scrollable lists. Again, FIG. 1B illustrates what could be a scrollable list, here presented vertically. Present invention differs when displaying the scrollable list as all available space of the display may be occupied by the scrollable lists. Indeed, contrary to existing method, there is no buttons to display like the "Start" button shown in FIG. 1B.

Figure 7:
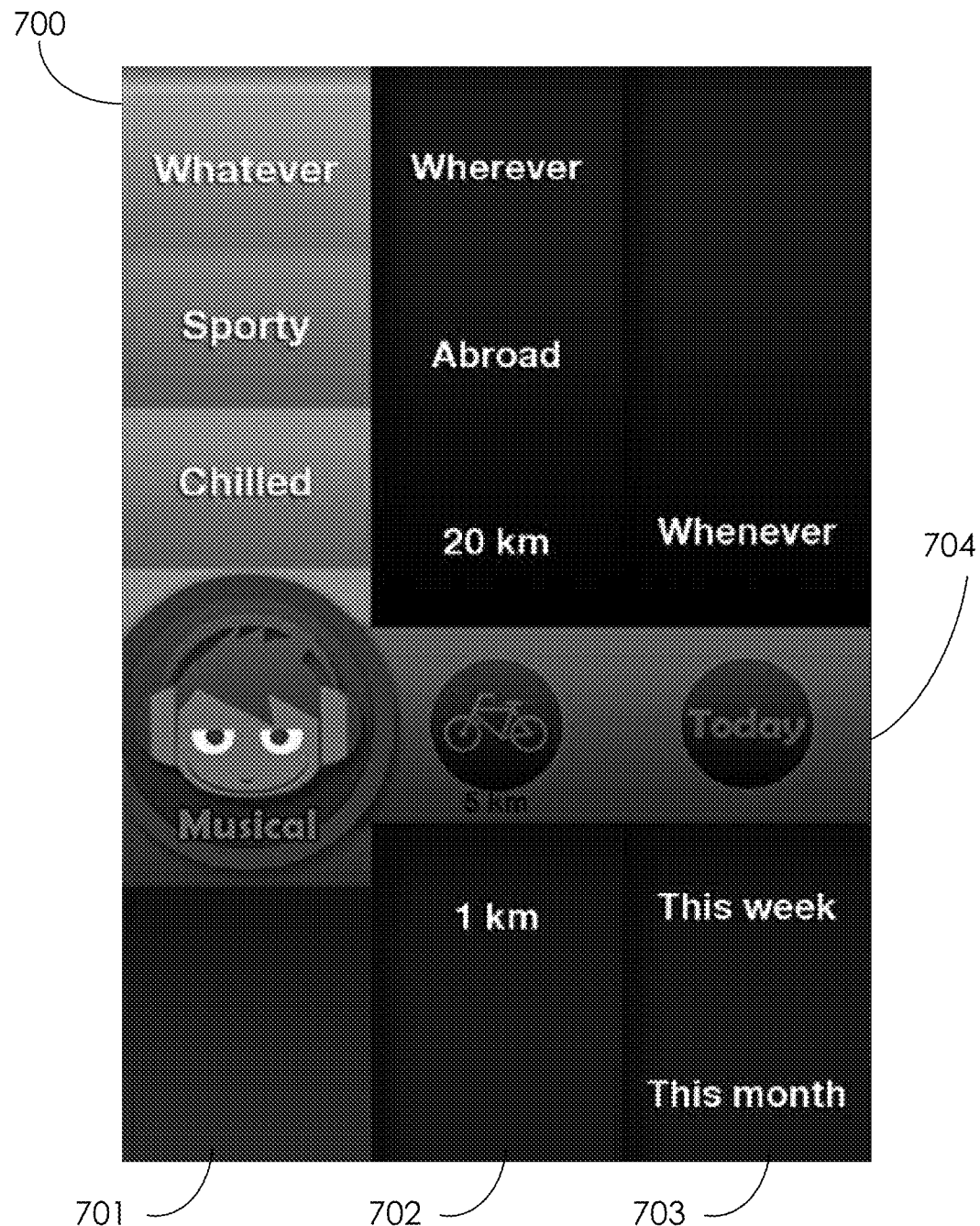
FIG. 7 shows an exemplary GUI for present method for displaying on the user interface a plurality of entries on three scrollable list.

FIG. 7 is an illustration of the display as defined in step 310 of present invention. Here, three scrollable lists are presented in the display 700, the lists being scrollable along a vertical direction. The first list of FIG. 7 shows a list 701 including the entries "Musical", "Chilled", "Sporty" and "Whatever". More entries may be part of this first list, the user may need to scroll down the list to show these entries. The second list 702 represented in FIG. 7 shows the entries "1 km", "5 km", "20 km", "abroad" and "wherever". The third list 703 comprises at least the entries "This month", "This week", "Today" and "Whenever". Again, entries in list 701, 702 and 703 may be hidden in the illustrative example 700, the user may need to scroll each list to reveal others possible entries as the man skilled in the art knows. Such application described in FIG. 7 allows a user to look for events like concerts, exhibition, museum, or any other type of events, said events corresponding to certain user criteria. FIG. 7 is an illustrative example of how the steps of selection of these criteria may be implemented using present method. The interface shown in FIG. 7 permits the user to specify firstly a type of activity or event ("Musical" would include concert for example), secondly a proximity to present location and finally an indication of timing for the searched event. By selecting for example the combination of "musical" in the first list, "5 km" in the second list and "This month" in the third list, the user will trigger a search on an event like a concert or a music related event, said event being held during the current month and held within 5 kilometers of the user location, said location being determined when the user uses the application. The application will in a second step present on the display a list of events corresponding to the user criteria, possibly offering the option to buy tickets or make a booking.

Figure 4A:
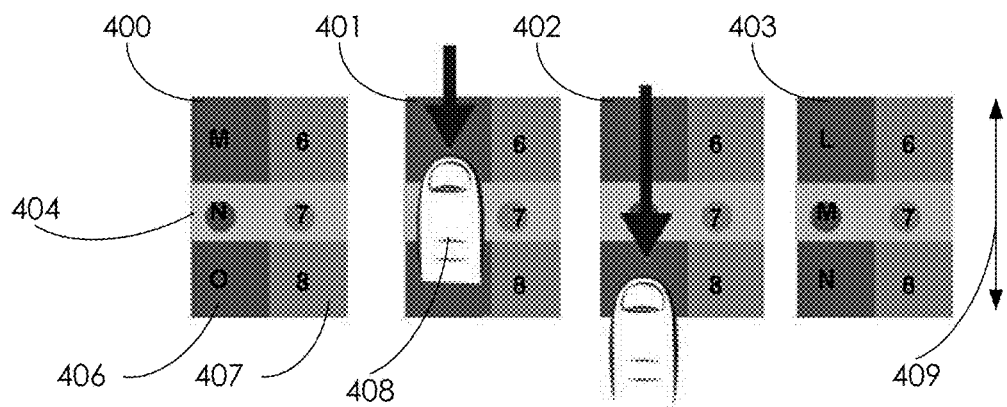

In the following steps 320, 330 and 340, the user may scroll the different lists to choose the desired entry. In this case, the user should chose among three lists but the number of list is not limited and the man skilled in the art would easily deduce how to implement the present method with more than three scrollable lists (the main limit would be readability on the display). The scrollable lists could be also for example list 406 and list 407 (in a case with only two different lists). The application captures the user input on the first list to move said first list from a first to a second position in the first direction, allowing the user to scroll among the different entries of the list. This is illustrated in FIG. 4A with a scrolling of the finger 408 in a vertical direction illustrated by the arrow 409. Same method applies to the different presented list on the display. There is no specific order for the user to choose among the different lists, and the user may go back and forth between all the lists, modifying its different choices.

Advantageously, during steps 320, 330 or 340, when the user is scrolling one of the lists, the others lists may be locked. Thus, the user may not accidentally scroll two lists at the same time if the user sliding is not exactly along the right direction.

In step 350, the user selects the entries he had previously chosen in steps 320, 330 and 340. This step is implemented by detecting a user sliding input from a first entry of the first list in the second position in a second direction distinct from the first direction. The sliding input is directed towards the at least second list. This results in selecting the first entry and a second entry of the at least second list in the direction of the user sliding input. Different possible implementations of such step 350 are illustrated in FIGS. 4B, 4C, 5A and 5B.

Other implementations are possible; these illustrations should not be considered as the only possible implementation. The different embodiment described in FIGS. 4B, 4C, 5A and 5B focus on a user sliding input from a first entry of the first list in the second position in a second direction distinct from the first direction and towards the at least second list wherein the first list is located on the left of the display, describing a user sliding gesture from left to right. However, in other alternative embodiment of present method, the user sliding gesture can be performed along a same direction but from left to right.

Thus, in one embodiment of present method, the user does a sliding, beginning from the first entry of the first list. If the scrollable lists are scrollable along a vertical axis (vertical here relating to the figures, see FIG. 1 to 7), the user sliding of step 350 is performed along the horizontal direction, as illustrated in FIGS. 4B, 4C, 5A and 5B. Said direction may be visually represented using for example a graphical object as illustrated by 404, helping the user to slide along the right direction, here in FIG. 4A the horizontal direction. Different visual feedback may be displayed to the user for an improved user experience or comprehension of the method of selection as it will be described more in details hereafter when describing FIGS. 4 and 5.

Another illustration of such graphical object could reuse what can be seen in FIG. 1B, where entries 160 and 170 are rendered differently to highlight the horizontal direction.

In the present description and figures, the first and second directions are advantageously chosen as respectively vertical and horizontal directions, but another embodiment of the present method inversing the two directions is possible. In this case, the scrollable lists would be scrolled along the horizontal direction meanwhile the user sliding to select the entries would be done along a vertical direction, either beginning from the top or the bottom of the display according to the embodiment. Also, in another embodiment the method may be implemented using two non orthogonal directions.

Figure 5A:
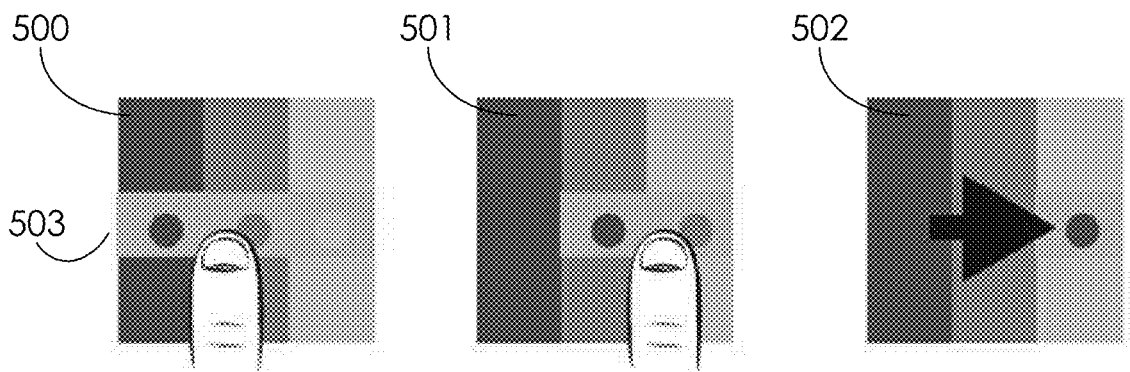
FIGS. 5A, 5B and 5C show exemplary GUIS for the selection of entries in accordance with additional embodiments of the present system.
Figure 5B:
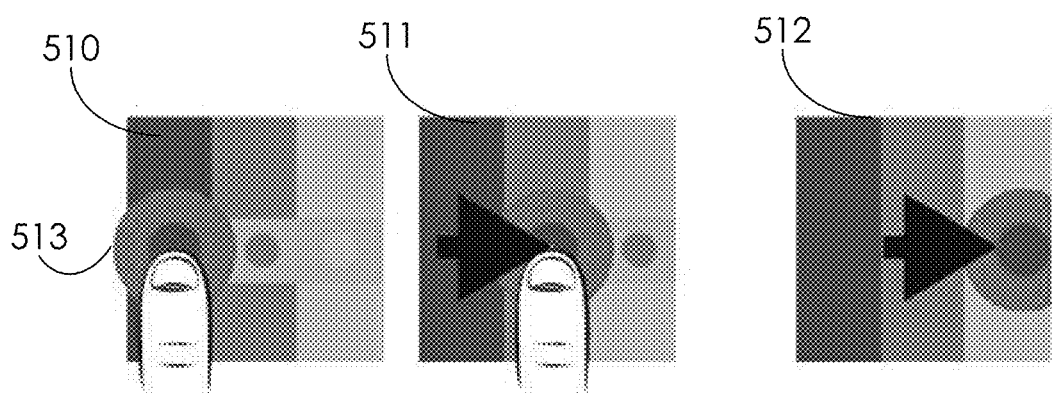
Figure 5C:
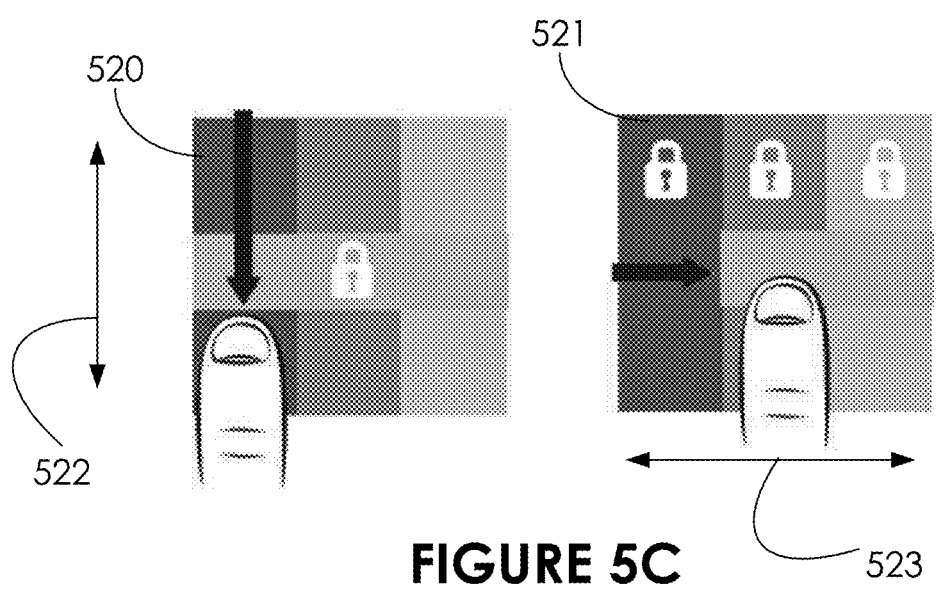

Advantageously, during the step 350, and as illustrated in 521 of FIG. 5C, the scrollable lists may be locked, preventing the lists to scroll. Indeed, this facilitates the user selection by preventing the user to change inadvertently any entry of a list if the user sliding is not exactly along the right direction. In one embodiment, the scrollable lists are locked when detecting the user sliding input from the first entry along the second direction.

Figure 6A:
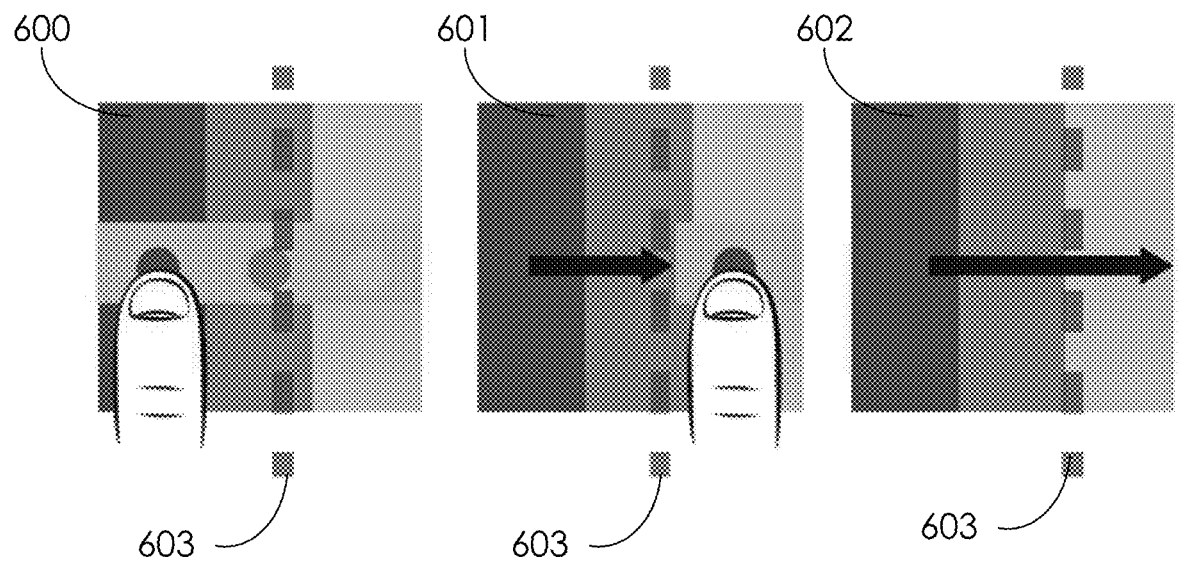
FIGS. 6A and 6B show exemplary GUIS for the selection of entries in accordance with additional embodiments of the present system.
Figure 6B:
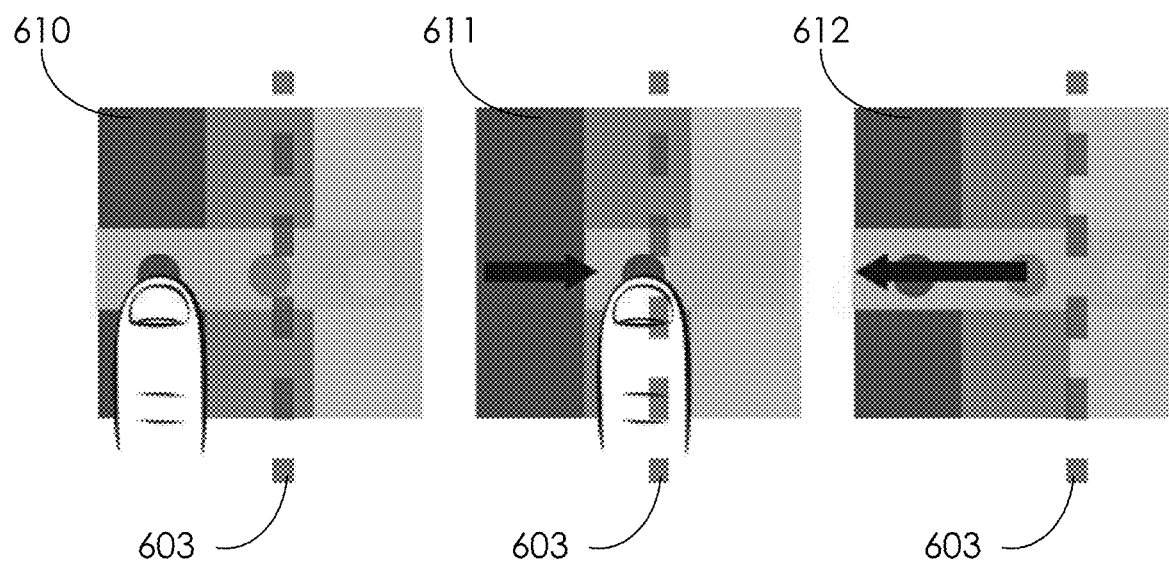

In step 360, the selection of the entries chosen in step 350 is validated. FIG. 6 described one embodiment of the validation step 360. In this embodiment, the validation is effective when the user sliding input along the second direction reaches a predefined distance as described in FIG. 6A with a vertical dotted line. If the user releases its gesture before reaching the predetermined distance, the selected entries may slide back to their initial position as shown in FIG. 6B.

Other embodiment of present method may implement the validation step differently. Possibly, the validation step may for example be performed by a user sliding input maintained during a predetermined time, or a combination of reaching a certain distance and maintaining the gesture during a certain time. In another embodiment, the validation may be implemented by defining a certain user gesture, for example by finishing the user gesture sliding described in 350 by a sliding in another direction or according to a certain pattern.

In step 370, once the entries are selected and validated, the application described in 300 gets the selection and may continue its execution. If for example the present method is used to implement a timer application (i.e. the application shown in FIG. 1B transposed to the present method), the timer countdown will begin in the step 370. Advantages of present method over prior art described in FIG. 1B are multiple. One of the advantages is that the whole display may be used to show the scrollable lists, increasing the readability over existing solution as in FIG. 1. Indeed, an implementation of a timer application as shown in FIG. 1 using the present method described in this text will not need to display graphical element 150 for the validation button. Another advantage of present method is that when the user first selects the entries by beginning the user gesture sliding, the user gets insurance that by finishing the gesture, thus triggering the validation, he will validate the selected entries and no others entries. Moreover user sliding inputs are less sensitive than a touch on a button like shown in FIG. 1 150 to user errors, as it avoids errors by pressing inadvertently a button 150

FIG. 4A has been shortly described previously, we will detail it hereafter. This figure describes an exemplary embodiment of two scrollable lists 406 and 407, the lists being scrollable here along a vertical direction 409. In this exemplary embodiment of present method, a graphical representation 404 facilitates the user selection by highlighting which entries of the list are to be chosen within a list. In 400, the entry "N" is chosen for the list 406, and the entry "7" is chosen in the list 407. In 401 and 402, the user scrolls down the list 406, 408 representing the user finger going along the direction 409 toward the bottom of the figure. Accordingly, in 403, the result of the user gesture is shown, the entry "N" of the first list has been changed for the entry "M". The man skilled in the art knows how to implement such method of scrollable list.

Figure 4B:
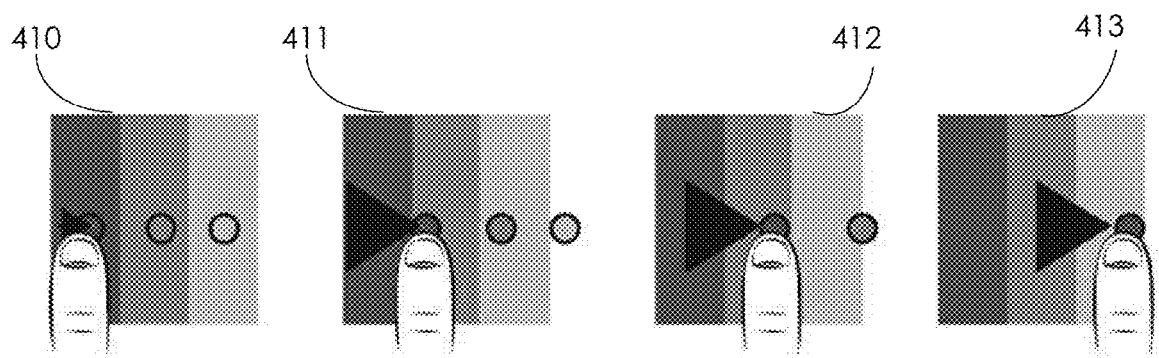
Figure 4C:
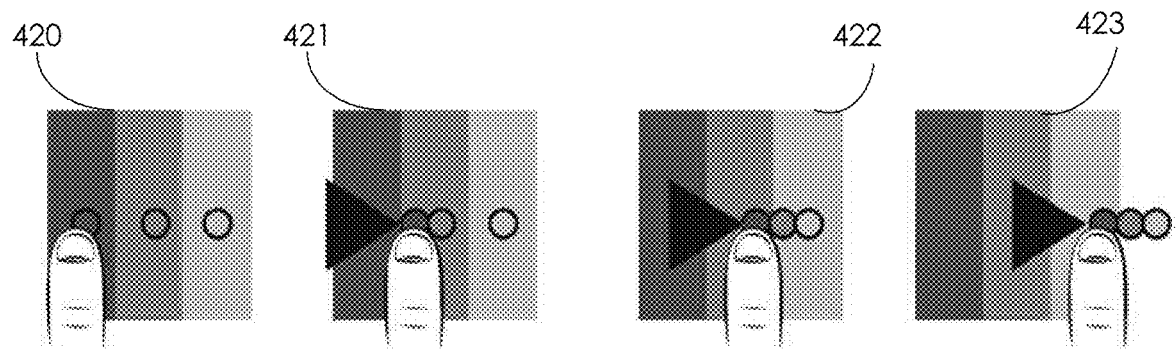

FIG. 4B and FIG. 4C describes the selecting of the first entry and at least a second entry further comprising the step of displaying on the user interface a graphical indication highlighting the first and at least second entries in the second direction. In the two illustrative implementation described in FIGS. 4B and 4C, the first and at least second entries—here three entries—are associated respectfully to a first and at least second graphical object, and the selecting of the first entry and at least second entry further comprises the step of moving the first and at least second graphical objects along the second direction with the user sliding input.

FIG. 4B shows an exemplary embodiment where the graphical objects associated to the entries selected by the users slide along with the user gesture sliding. FIG. 4C is another possible embodiment of a graphical indication highlighting the selected entries. In this case, the graphical objects associated to the entries are moved along the user gesture gradually as they touch each other, beginning by the first entry.

FIGS. 5A and 5B describe other possible embodiment of the step of displaying on the user interface a graphical indication highlighting the selected entries. In FIG. 5A, the graphical object 503, equivalent to the previously graphical object described in FIG. 4A as 404, may move along the second direction according to the user gesture. Indeed, as shown in 501 and 502, graphical object 503 follows the user gesture, and may keep on moving automatically once the user gesture has reached a predetermined distance along the second direction, giving a visual feedback on the step of the user validation.

FIG. 5B is an alternative embodiment of present method, similar to FIG. 5A. Graphical object 404 or 503 is slightly modified into graphical object 513 by adding an extension to the graphical object 503 highlighting the entry of the first scrollable list. The effect of such modification is to improve the readability of the interface by highlighting where the user should begin its sliding gesture to make the selection and, in a further step, the validation. It could be considered that in FIGS. 5A and 5B, the graphical objects described in FIGS. 4B and 4C are merged into a single graphical object 503. Advantageously, this graphical object 503 may be the same graphical object 404 as described in FIG. 4. Indeed, graphical object 404 may become a movable graphical object in order to implement the present method.

FIG. 5C has been partially described previously. 520 describes a possible embodiment of present method where scrolling any of the scrollable list—here the first one on the left for illustrative purpose—locks the possibility of selection of the entries. This prevents the user from accidentally selecting and possibly validating the selection when the user wants to scroll along one of the scrollable list to choose one entry. In a complementary embodiment of present method, FIG. 521 shows the locking of the scrollable lists when detecting the user sliding gesture along the second direction 523. More generally, when detecting a user gesture sliding along a first direction 522 or second direction 523, the method may advantageously lock the sliding in respectively the second direction 523 or first direction 522. This improves the user experience by preventing a user gesture not entirely done along a given direction to be misunderstood for another gesture by the method.

FIGS. 6A and 6B show an illustrative embodiment of the step of validating the selected entries. In a step 600, the user begins its user gesture of sliding from the first entry toward the second entry along a second direction, here the horizontal direction. Possibly, as seen before in FIG. 5C, at this stage, the scrollable list becomes locked. Thus, if the user gesture is not exactly along the second direction, the user will not inadvertently scroll one of the lists. In FIG. 601, the user gesture sliding has gone further than a predetermined distance, represented here by the dotted line 603.

This dotted line 603 may or may not be shown on the display to preserve readability. Alternatively, the predetermined distance 603 may dynamically appear only when needed, for example when detecting a user sliding input from a first entry of the first list in a second direction and towards the at least second list, meaning when the user begins the gesture of selecting the entries for a possible further validation.

The graphical object 513 may continue to move automatically until the border of the display after the validation step.

In a complementary embodiment, the user may need to maintain the gesture during a certain time after having gone further the predetermined distance. On the contrary, in another implementation of present method, the user may have the possibility of canceling the validation by maintaining its gesture during a certain time after having gone further than the predetermined distance.

FIG. 6B illustrates one embodiment of present method, when the user gesture sliding is stopped before the predetermined distance. Thus, the validation is not performed, and a visual feedback may be given to the user by automatically moving back the graphical 513 object to its initial position.

FIG. 7 is an illustration of one embodiment of present method. Here, the graphical object 704 is movable along the horizontal direction, said direction being the second direction. Three scrollable lists 701, 702 and 703 are presented, each one scrollable along a first direction, said direction being the vertical direction. Here, the user made the choice of the entries "Musical", "5 km" and "Today". Said choice was made by previously scrolling each list 701, 702 and 703 to choose the elected entry among the different position of the list, each position corresponding to a different entry. Thanks to present method, the user may select and further validate its selection by sliding along the graphical object 704 toward the right of the figure, validation being performed when the sliding reaches a predefined distance.

Although the present disclosure has been described with reference to one or more examples, workers skilled in the art will recognize that changes may be made in form and detail without departing from the scope of the disclosure and/or the appended claims.

The invention claimed is:

1. A method for selecting entries from a user through a user interface displayed by an electronic device, the method comprising:
    displaying on the user interface simultaneously a first and at least a second list having a plurality of entries, wherein each of the first and second lists is scrollable separately from the other along a same first direction of the user interface,
    capturing a first user input on the first list to scroll said first list from a respective first position to a respective second position in the first direction,
    capturing a second user input on the second list to scroll said second list from a respective first position to a respective second position in the first direction, the first and second user inputs aligning a first entry of the first list with a second entry of the second list adjacent to one another; —upon detection of a single user sliding input from the first entry of the first list in the respective second position in a second direction, which is distinct from the first direction and towards the second entry of the second list in the respective second position, selecting the first entry of the first list and the second entry of the second list,
    validating the selection of the first entry of the first list and the second entry of the second list in response to the single user sliding input completing a predefined operation while selecting the first and second entries, and
    in response to validating the selection of the first and the second entries, executing a predefined action of an application to display a search result based on at least the first and the second validated entries.

2. The method according to claim 1, further comprising when detecting the user sliding input:
    locking the scrolling of the first and at least second list along the first direction during the sliding input.

3. The method according to claim 1, wherein the selecting of the first entry and the second entry further comprises:
    displaying on the user interface a graphical indication highlighting the first and second entries along the second direction.

4. The method according to claim 1, wherein the selecting of the first entry and the second entry comprises:
    selecting the first entry and the second entry of the at least second list upon the user sliding input along the second direction reaching a predefined distance.

5. The method according to claim 1, wherein the first and second entries are respectively associated to first and second graphical objects displayed on the user interface, and wherein the selecting of the first entry and the second entry further comprises:

moving the first and second graphical objects on the user interface along the second direction with the user sliding input.

6. The method according to claim 1, wherein the predefined action comprises the user sliding input along the second direction reaching the predefined distance.

7. The method according to claim 1, wherein the predefined action comprises maintaining a gesture for a predetermined time.

8. The method according to claim 1, wherein the predefined action comprises maintaining a gesture for a predetermined time after having gone further than a predetermined distance.

9. An electronic device comprising:
a user interface;
and a processor arranged to:
display on the user interface simultaneously a first and at least a second list having a plurality of entries, wherein each of the first and second lists is scrollable separately from the other along a same first direction of the user interface,
capture a first user input on the first list to scroll said first list from a respective first position to a respective second position in the first direction,
capture a second first user input on the second list to scroll said second list from a respective first position to a respective second position in the first direction, the first and second user inputs aligning a first entry of the first list with a second entry of the second list adjacent to one another,
upon detection of a single user sliding input from the first entry of the first list in the respective second position in a second direction, which is distinct from the first direction and towards the second entry of the second list in the respective second position, selecting the first entry of the first list and the second entry of the second list,
validate the selection of the first entry of the first list and the second entry of the second list in response to the single user sliding input completing a predefined operation while selecting the first and second entries, and
in response to validating the selection of the first and the second entries, executing a predefined action of an application to display a search result based on at least the first and the second validated entries.

10. The electronic device according to claim 9, wherein the processor is further arranged to:
lock the scrolling of the first and at least second list along the first direction during the user sliding input.

11. The electronic device according to claim 9, wherein the processor is further arranged to:
display on the user interface a graphical indication highlighting the first and second entries along the second direction, comprised in the selecting of the first entry and the second entry.

12. The electronic device according to claim 9, wherein the processor is further arranged to:
select the first entry and the second entry of the at least second list upon the user sliding input along the second direction reaching a predefined distance, comprised in the selecting of the first entry and the second entry.

13. The electronic device according to claim 9, wherein the first and second entries are respectively associated to first and second graphical objects displayed on the user interface, and wherein the processor is further arranged to:

move the first and second graphical objects on the user interface along the second direction with the user sliding input, comprised in the selecting of the first entry and the second entry.

14. A non-transitory storage medium comprising a computer program stored thereon and comprising program code instructions for implementation of a method for selecting entries from a user through a user interface displayed on an electronic device when the program is executed by a processor, wherein the method comprises:
displaying on the user interface simultaneously a first and at least a second list having a plurality of entries, wherein each of the first and second lists is scrollable separately from the other along a same first direction of the user interface,
capturing a first user input on the first list to scroll said first list from a respective first position to a respective second position in the first direction,
capturing a second user input on the second list to scroll said second list from a respective first position to a respective second position in the first direction, the first and second user inputs aligning a first entry of the first list with a second entry of the second list adjacent to one another; —upon detection of a single user sliding input from the first entry of the first list in the respective second position in a second direction, which is distinct from the first direction and towards the second entry of the second list in the respective second position, selecting the first entry of the first list and the second entry of the second list,
validating the selection of the first entry of the first list and the second entry of the second list in response to the single user sliding input completing a predefined operation while selecting the first and second entries, and
in response to validating the selection of the first and the second entries, executing a predefined action of an application to display a search result based on at least the first and the second validated entries.

15. The non-transitory storage medium according to claim 14, further comprising wherein when detecting of the user sliding input:
locking the scrolling of the first and at least second list along the first direction during the sliding input.

16. The non-transitory storage medium according to claim 14, wherein the selecting of the first entry and the second entry further comprises:
displaying on the user interface a graphical indication highlighting the first and second entries along the second direction.

17. The non-transitory storage medium according to claim 14, wherein the selecting of the first entry and the second entry comprises:
selecting the first entry and the second entry of the at least second list upon the user sliding input along the second direction reaching a predefined distance.

18. The non-transitory storage medium according to claim 14, wherein the first and second entries are respectively associated to first and second graphical objects displayed on the user interface, and wherein the selecting of the first entry and the second entry further comprises:
moving the first and second graphical objects on the user interface along the second direction with the user sliding input.

* * * * *